INVENTORS
JU C. TU
RICHARD M. BIRD
RICHARD H. FULLER
BY
ATTORNEYS

INVENTORS
JU C. TU
RICHARD M. BIRD
RICHARD H. FULLER
BY
ATTORNEYS

United States Patent Office 3,453,445

Patented July 1, 1969

3,453,445

WORD LOGIC CIRCUIT

Ju C. Tu, Sylmar, Richard H. Fuller, Sherman Oaks, and Richard M. Bird, Glendale, Calif., assignors to Singer-General Precision, Inc., a corporation of Delaware Filed May 4, 1965, Ser. No. 452,998
Int. Cl. G11b *5/00;* H03k *19/00*
U.S. Cl. 307—88 8 Claims

ABSTRACT OF THE DISCLOSURE

A magnetic core memory circuit for use in an associated type memory, in which an address or input word is simultaneously compared in accordance with a preselected comparison criterion, with each of the words stored in memory, to control the modification of data stored in any of the words which compares with said input word is disclosed. The circuit includes at least one magnetic core associated with each of the memory words and a sense amplifier, which provides a signal as a function of the comparison between the word with which it is associated and the input word. The state of magnetic remanence of the core is controlled so as to control the supply of current from a current supplying source to the memory word. As a result, only the content of memory words which compare or match the input word in accordance with the preselected comparison criterion may be provided with content modifying currents.

This invention relates to computer circuitry and more particularly to a logic circuit utilizing magnetic cores.

Advanced computer technology has led to the development of computers with associative or content addressable memories. In such a computer, the entire content of the data such as a plurality of multibit words, stored therein, can be simultaneously compared with a particular input, or address word, in order to determine if and/or how many of the stored words match the address word. Generally, a sense amplifier is associated with each of the stored words. The function of the amplifier is to produce an output signal which indicates whether or not the stored word matches the address word. Quite often, it is desirable to modify the content of the stored words which match a given address word. Circuits have, therefore, been developed to control the words stored in a content addressable memory in such a manner that only the content of those words which match the address word can be changed, while the unmatched words remain unaltered. These circuits, in addition to the sense amplifiers, include bistable circuits, such as flip-flops, current drivers and associated intercoupling wires and connections. The circuits greatly increase the complexity of presently known content addressable memory by the number of components used and by the complex wirings which is required. Thus, it is desirable to have a circuit which can perform the desired function of inhibiting unmatched words from being altered, but which is simpler and includes fewer parts than presently used arrangements.

Accordingly, it is an object of the present invention to provide a novel computer memory circuit for controlling the altering of the content of the data stored therein.

Another object of the present invention is the provision of a simple circuit for sensing words in a computer memory which match an address word, and for controlling the altering of the contents thereof.

A further object is to provide a new and useful circuit which performs functions similar to those performed by presently known circuits, but which greatly simplifies prior art arrangements.

Still a further object is to provide a new circuit which is less complex and uses fewer components than prior art circuits performing similar functions.

These and other objects are achieved by providing a circuit which incorporates a sense amplifier interconnected with at least one magnetic core. The circuit is used to control the altering of the data stored in a word with which it is associated, depending on whether the word matches an address word with which it in compared. The cores are made of magnetic material which has two stable states of magnetic remanence, with the cores being switchable therebetween. The cores are threaded with a plurality of windings, used to control the characteristics of the current which is provided to the word with which the circuit is associated in order to alter the contents thereof. In addition, the output signal of the sense amplifier which senses the comparison between the word and the address word is also supplied to the cores in such a manner that when the word does not match the address word, a signal inhibits the cores from supplying a current to the word, thereby preventing the altering of any of the contents thereof. The cores are inhibited by being switched to a particular state of magnetic remanence so that they cannot supply any current to the word with which they are interconnected.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
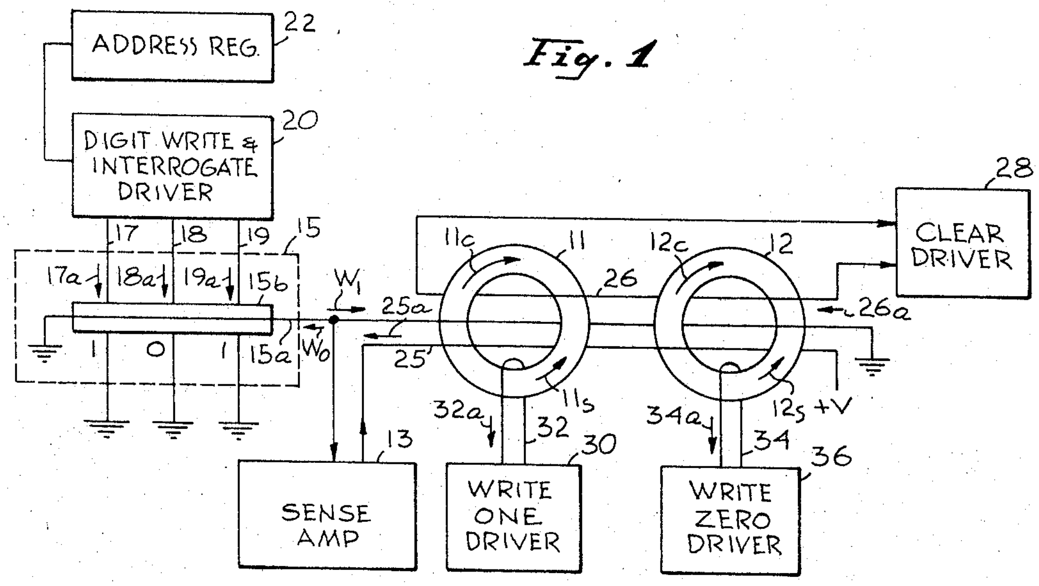
FIGURE 1 is a combination block and schematic diagram of one embodiment of the present invention utilizing a pair of cores.

Reference is now made to FIGURE 1 which is a block diagram of one embodiment of the present invention shown comprising a pair of magnetic cores 11 and 12 and a sense amplifier 13 which is coupled to a word 15. The word 15 is assumed to be part of an associative memory, wherein each word can be simultaneously compared with an input word to determine the similarity therebetween.

For explanatory purposes, the word 15 is assumed to comprise a nonmagnetic wire **15*a*, such as copper, on which a thin magnetic film 15*b* is plated. During the plating, a current flows in the wire 15*a* in order to create a circumferential easy axis of magnetization in the film 15*b*. The word 15 is assumed to be interwoven by a plurality of binary digits or bit lines, three of which are designated by numerals 17, 18 and 19 and are shown connected to a digit write interrogate driver 20**.

A plurality of bits of information may be stored or written along the plated wire **15*a* by the coincidence of currents in the wire 15*a* in any or all of the wires 17, 18 and 19. A binary "one" is stored at the intersection of the film 15*b* and any one of the bit lines in the form of a first direction of circumferential flux, while a binary "zero" is stored as a second opposite direction of circumferential flux. Assuming that the polarity of the current from driver 20 for writing a "zero" or a "one" is the same, as indicated by arrows 17*a*, 18*a*, and 19*a*, it is the polarity of the current in wire 15*a*** that is controlled in order to store the proper data.

During one cycle of the writing operation, when "ones" are to be stored, a current flows in wire **15*a* in the direction of arrow $W_1$, while during a subsequent cycle, when "zeros" are stored, the current flows in the direction of arrow $W_0$. Thus, if the word to be stored is for example 101, during the first cycle when the current in wire 15***a* is in the $W_1$ direction, current is also supplied from the driver 20 to lines 17 and 19. Then, during the subsequent cycle, the current in wire 15*a* is in the $W_0$ direction and current from driver 20 is only supplied to line 18.

The data (101) stored in word 15 may be compared with data, of an address word temporarily entered in an address register 22, which is connected to driver 20. This is accomplished by providing lines 17, 18 and 19 with interrogate currents which have polarities related to the bits of the address word in register 22. The currents flowing in lines 17, 18 and 19 induce a current signal in wire 15*a* only if any one of the bits in the two words is not the same. However, if the two words are identical, i.e., all the bits are the same, a signal is not induced in the wire 15*a*. Thus, the absence or presence of a current signal induced in wire 15*a* indicates whether the two words match or not. Any current signal indicating a mismatch is assumed to actuate the sense amplifier 13 which has its output line 25 threaded through cores 11 and 12 and shown connected to a source of positive potential designated +V.

Each of the two cores is of magnetic material which has two stable states of magnetic remanence, hereafter referred to as the clear and set states, between which the core may be switched. As seen, the cores are also threaded by a winding 26 which is connected to a clear driver 28, capable of inducing a current in the winding 26 in the direction of arrow 26*a*. The line or winding 25 and the winding 26 are threaded through each of the cores in opposite directions. Thus, assuming that the current from driver 28 drives the cores to their clear state, as indicated by arrows 11*c* and 12*c* pointing in a clockwise direction, the current in winding 25 would drive the cores to their set state, as indicated by arrows 11*s* and 12*s*. As seen from FIGURE 1, core 11 is coupled to a write one driver 30 by a winding 32, threaded in the same direction as winding 25. A winding 34 is threaded through core 12 in the same direction as winding 25 and it couples the core to a write zero driver 36.

From FIGURE 1, it should thus be appreciated that a current from the driver 30 flowing in winding 32 in the direction of an arrow 32*a* will set core 11 to its set state. Similarly, a current from driver 36 in winding 34 in the direction of an arrow 34*a* will set core 12 to its set state. Thus core 11 may be set by currents in winding 25 or winding 32, while core 12 may be set by a current in either winding 25 or winding 34. When either core is in its clear state and a current is induced in winding 32, the core 11 switches to its set state of magnetic remanence and as a result induces a current in wire 15*a* in the direction indicated by $W_1$. Similarly, when core 12 is in its clear state of magnetic remanence, a current in winding 34 will switch core 12 to its set state of magnetic remanence, which induces a current in wire 15*a* in the direction of arrow $W_0$. Thus as long as cores 11 and 12 are in their clear state of magnetic remanence, drivers 30 and 36 may be used to induce currents in either the direction of arrow $W_1$ or the direction of $W_0$ respectively, in order to enable the rewriting of data in the word 15.

In operation, prior to searching the memory which includes the word 15, the cores 11 and 12 associated with the word 15 are driven to their clear state of magnetic remanence by driver 28. Thereafter, the word 15 is interrogated by digit currents induced by driver 20 in lines 17, 18 and 19. If word 15 does not match the word in address register 22, namely a mismatch is present, sense amplifier 13 is energized, so that a current flows in line 25 in the direction of arrow 25*a*. The current in line or winding 25 is sufficient to set the cores 11 and 12 to their set state of magnetic remanence so that when driver 30 is later energized, core 11 is already in its set state so that a current is not induced in wire 15*a*. Namely "ones" are not rewritten in a word which does not match the word in the address register. Similarly, when during the subsequent step, driver 36 is energized, the core 12 is already in its set state of magnetic remanence so that again a current is not induced in wire 15*a* to rewrite the "zeros" in word 15.

If however, the word in the address register 22 matches the word 15, the sense amplifier 13 is not energized. Thus after the search operation, the cores 11 and 12 remain in their clear state of magnetic remanence. Thereafter the driver 30 is energized to induce a current in winding 32 which as a result, switches core 11 to its set state of magnetic remanence and induces a current in wire 15*a* in the direction of arrow $W_1$, in order to rewrite the appropriate "one" bits in word 15. After the "one" bits are written, driver 36 is energized to set core 12 to its set state of magnetic remanence and induce another current in wire 15*a* in the direction of arrow $W_1$ in order to write the appropriate "zeros" in word 15. Thus, only if word 15 matches the word in register 22 can the content thereof be rewritten during a subsequent write operation.

From the foregoing, it is thus seen that the sense amplifier, together with the two cores (11 and 12), operate to control the rewriting of data in word 15, depending on whether or not the word 15 matches the word in the address register 22. If during the search operation the word 15 matches the word in the register 22, the two cores remain in their clear state of magnetic remanence so that during a subsequent rewrite operation, they are driven to their set states to induce currents in wire 15*a* so as to rewrite the data in word 15. However, if word 15, during the initial search operation, does not match the word in register 22, sense amplifier 13 is energized to produce a current in wire 25 which presets the cores 11 and 12 to their set state of magnetic remanence, so that during the subsequent rewrite operations, the currents from drivers 30 and 36 do not effect or produce a current in wire 15*a* and thereby inhibit the rewriting of data in word 15.

Figure 2:
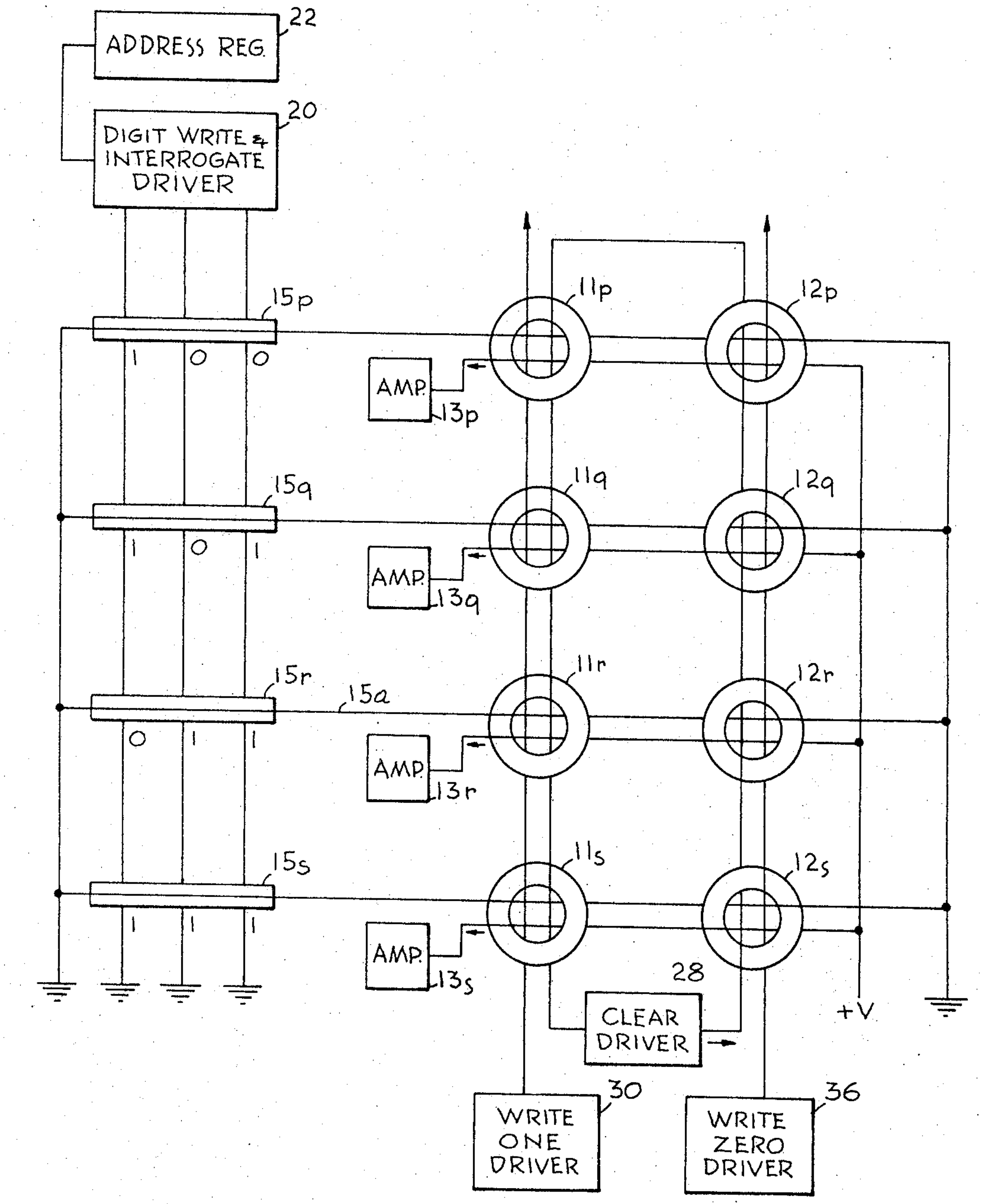
FIGURE 2 is an expanded matrix diagram of a plurality of circuits shown in FIGURE 1.

Reference is now made to FIGURE 2 which is a matrix diagram of four memory words designated 15*p*, 15*q*, 15*r*, and 15*s*. The words are shown coupled to the driver 20 in a manner similar to that described in conjunction with FIGURE 1. Each of the words is associated with the novel circuit of the present invention, comprising a sense amplifier and a pair of magnetic cores. The amplifier and the two cores are designated by the same subscript as the word with which they are associated. The clear driver 28 and the write one driver 30 and write zero driver 36 are shown intercoupled in a manner similar to that previously described.

In operation, prior to comparing the words with the word in the address register which, for explanatory purposes, is assumed to store a three bit word 011, the clear driver 28 drives all the magnetic cores to their clear state of magnetic remanence. Thereafter, the search or interrogate operation is conducted. Since only word 15*r* is assumed to match the word in the address register 22, only amplifier 13*r* will not be energized, while amplifiers 13*p*, 13*q*, and 13*s* will be energized. The energization of the three amplifiers will result in driving cores 11*p*, 12*p*, 11*q*, 13*q*, 11*s*, and 12*s* to their set state of magnetic remanence. Consequently, at the end of the search operation, only cores 11*r* and 12*r* are in their clear state of magnetic remanence. Thus, when current is provided by write one driver 30, core 11*r* is driven to its set state of magnetic remanence, thereby inducing a current in wire 15*a* associated with word 15*r* to rewrite the content of the "ones" therein. Subsequently, driver 36 is energized to drive core 12*r* to its state of magnetic remanence and induce another current of opposite polarity in wire 15*a* to rewrite the zeroes in word 15*r*.

Figure 3:
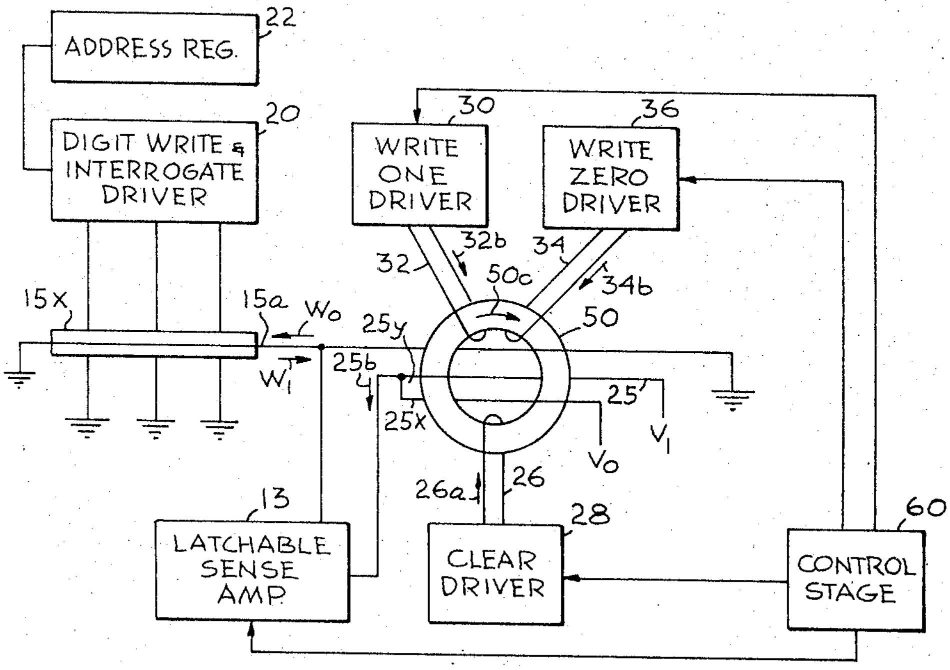
FIGURE 3 is a combination block and schematic diagram of another embodiment of the invention utilizing a single core.

The number of magnetic cores used in the novel circuit of the present invention may be reduced to one as shown in FIGURE 3 to which reference is made herein.

FIGURE 3 is a combination block and schematic diagram of another embodiment of the invention similar to the arrangement shown in FIGURE 1, with like elements being designated by like numerals. As seen, a single core 50 is shown threaded through by a plurality of windings from drivers 28, 30, and 36, as well as the wire 15*a*, from a multibit word 15*x*. However, whereas in the previous arrangement (FIGURE 1), each of the cores is wound by a single winding designated by numeral 25 from the sense amplifier 13, in the arrangement of FIGURE 3, a pair of windings 25*x* and 25*y* interconnect a latchable or bistable sense amplifier 13 to reference potentials $V_0$ and $V_1$ respectively. The windings 25*x* and 25*y* are threaded through the core 50 in opposite polarities.

Sense amplifier 13 may be of the latchable type, for example, a bistable sense amplifier which, in response to a current signal in wire 15*a*, switches from a first stable state to a second stable state. The potential at the output of the sense amplifier depends on its stable state of operation. For explanatory purposes only, as used herein, the terms "latchable sense amplifier," "unlatched" and "latched," should be assumed to be analogous to a bistable sense amplifier, a first stable state of operation, and a second stable state of operation thereof, respectively.

The operation of the arrangement shown in FIGURE 3 is similar to that hereinbefore described. Namely, core 50 is first driven to its clear state of magnetic remanence by driver 28. The clear state is indicated by arrow 50*c*. Thereafter, the word 15*x* is compared with the word in the address register 22. If the words match, a current signal is not induced in line 15*a*. Consequently, the sense amplifier remains unlatched i.e., in a first stable state. Thereafter, reference potential $V_1$ is pulsed to provide a pulse in winding 25*y* only if sense amplifier 13 is latched i.e., in its second stable state in order to drive core 50 to its set state. Since it is assumed that word 15*x* matches the word in register 22, amplifier 13 is unlatched i.e., in its first stable state so that the pulsing of reference potential $V_1$ does not produce a pulse in winding 25*y*. Thus, core 50 remains in its clear state.

Thereafter, a current in the direction indicated by arrow 32*b* is induced by driver 30 in winding 32 in order to set the core 50 to its set state of magnetic remanence. Consequently, a current is induced in wire 15*a* in the direction of arrow $W_1$ in order to rewrite the "ones" in word 15*x*.

After rewriting the "ones," the reference potential $V_1$ is disabled and potential $V_0$ is pulsed so that a current is induced in winding 25*x* only if sense amplifier 13 is latched such, namely, the amplifier 13 is in its second stable state. Such current drives the cores associated with mismatched words to their clear state of magnetic remanence. However, in the present example, since amplifier 13 is assumed unlatched (i.e. 15*x* matches word in register 22) the pulsing of $V_0$ does not induce a pulse in 25*x* so that core 50 remains in its set state after the rewriting of the "ones." During the last step, driver 36 induces a current in winding 34 in the direction of arrow 34*b*. This current drives core 50 to its clear state, thereby inducing a current in winding 15*a* in the direction of arrow $W_0$, to rewrite the "zeroes" of word 15*x*.

From the foregoing, it was thus seen that a single core can be used to control the rewriting of data in word 15*x*, depending on whether the word matches the word in register 22. The core is associated with the sense amplifier which is latched in the mismatch case and two reference potentials which are pulsed to inhibit the core from inducing rewrite currents if the word to which the core is coupled does not match the word in the address register.

In another embodiment of the present invention, an arrangement similar to that shown in FIGURE 3 is employed, but without the second reference potential $V_0$ and winding 25*x*. The operation is similar to that previously described. At the end of the search or interrogate operation, sense amplifier is latched (driven to its second stable state) if word 15*x* does not match the word in register 22 so that a pulse in winding 25*y* drives core 50 to the set state. If the words match one another, the amplifier remains unlatched. Thus, a pulse is not induced in winding 25*y* so that the core 50 remains in the clear state.

Thereafter, the write one driver 30 drives the core 50 to the set state to induce a $W_1$ current in winding 15*a* to rewrite the "ones" in word 15*x*. Then, the cores associated with all the words in the memory are driven to their clear state (by energizing driver 28) and the amplifiers associated with matched words are latched (driven to their second stable state) to set the cores associated therewith. Thus, at this stage of the operation, all the cores associated with the matched words are in the set state and those associated with the mismatched words are in the clear state. The write zero driver 36 is then energized to switch the core 50 to its clear state so as to induce the current in winding 15*a* in the $W_0$ direction to store the "zeroes" in word 15*x*. The signals necessary to control the sequence of operation may be provided by the computer in which the novel circuit of the invention is included, as well as by a special control stage 60, to which drivers 28, 30 and 36 and the sense amplifier 13 are connected.

From the foregoing, it should be appreciated that irrespective of the number of cores associated with each word, according to the teachings of the present invention, the cores associated with the words which match the word in the address register 22 are controlled to be in an opposite state of magnetic remanence than the state of the cores associated with mismatched words. The latter cores are controlled to be in a state of magnetic remanence which inhibits them from inducing currents in winding 15*a* as a result of the currents from drivers 30 and 36. The invention herebefore has been described whereby circuits associated with words which match a given input word are controlled to alter the content of the words. It is appreciated however that other comparison criteria may be chosen to select the group of words, the data content of which may be written, while inhibiting the rewriting of the data content of other words.

Accordingly, there has been shown and described hereinbefore, a novel circuit utilizing one or more magnetic cores for controlling the rewriting of data in any of a plurality of words which have been identified as matching a given word. It is appreciated that those familiar with the art may make modifications in the arrangements as shown without departing from the true spirit of the invention.

What is claimed is:

1. In a computer memory system having means for comparing a plurality of words stored therein with a particular word and for providing signals indicative of the stored words matching, in accordance with a selected comparison criterion, said particular word, said system further including means for rewriting the content of any of said plurality of words, an improved arrangement for controlling the rewriting of the content of said words comprising:

first means associated with each stored word for providing a signal indicative of the matching of said stored word with a particular word compared therewith;

second means for providing currents to modify the content of said stored words; and magnetic core means coupled to said first and second means to each of said stored words for providing said currents simultaneously only to stored words which match in accordance with said selected comparison criterion, said particular word compared therewith so as to modify the content of only matched words, said magnetic core means having two states of magnetic remanence and drivable therebetween.

2. A logic circuit for controlling the modifying of data words stored in a computer memory as a function of the comparison of each of said words with an input word comprising:

current source means for providing currents to modify at least some of the data words stored in said computer memory;

sensing means for sensing the comparison of each of said words stored in said computer with said input word and for providing signals indicative of the comparison therebetween; and magnetic core means having two states of magnetic remanence and drivable therebetween, and coupled to said current source means, to said sensing means and to said words in said memory for responding to the signals from said sense means which control the states of magnetic remanence of said magnetic core means to control the simultaneous supply of currents from said current source only to stored words which compare with said input word.

3. A circuit as recited in claim 2 wherein said magnetic core means include a pair of cores interconnected with each stored word, wherein the pair of cores of each stored word are driven to a set state of magnetic remanence as a function of said currents from said current source means or a signal from said sensing means indicative of a mismatch between said input word and the word with which said pair of cores are interconnected.

4. In a computer memory system including means for storing a plurality of multibit words, means for comparing each of the stored words with an input word, first driving means for modifying first bits of said stored words and second driving means for modifying second bits of said stored words, the improvement comprising:

a plurality of magnetic cores each having two states of magnetic remanence and drivable therebetween and coupled to another of said stored words;

means for driving the magnetic core coupled to one of said stored words to a first clear state of magnetic remanence;

a plurality of sensing means each coupled to one of said stored words for providing a comparison signal as a function of said stored word and said input word in accordance with a predetermined comparison criterion;

means for coupling said sensing means to said magnetic core for driving said core to a second set state of magnetic remanence as a function of said comparison signal;

means for coupling said first driving means to said magnetic core to drive it to said second set state of magnetic remanence to provide said word with a first current signal to modify the first bits stored therein; and means for coupling said second driving means to said magnetic core being in said second set state for driving it to said first clear state of magnetic remanence to provide said word with a second current signal to modify the second bits stored therein.

5. In a computer memory system including means for storing a plurality of multibit words, means for comparing each of the stored words with an input word, first driving means for modifying first bits of said stored words and second driving means for modifying second bits of said stored words, the improvement comprising:

a plurality of magnetic cores each having two states of magnetic remanence and drivable therebetween and coupled to another of said stored words;

means for driving the magnetic core coupled to one of said stored words to a first clear state of magnetic remanence;

a plurality of sensing means each coupled to one of said stored words for providing a mismatch signal only when said stored word does not match said input inhibiting winding means for coupling the sensing means coupled to a stored word to the magnetic core coupled to said word for driving said core to a second set state of magnetic remanence as a function of said mismatch signal;

means for coupling said first driving means to said magnetic core to drive it to said second set state of magnetic remanence to provide said word with a first current signal to modify the first bits stored therein;

means for driving the magnetic core coupled to sensing means other than sensing means which provide said mismatch signals to said second set state of magnetic remanence; and means for coupling said second driving means to said magnetic core being in said second set state for driving it to said first clear state of magnetic remanence to provide said word with a second current signal to modify the second bits stored therein.

6. In a computer memory system including means for storing a plurality of multibit words, each bit comprising a binary "one" or a binary "zero," means for comparing each of the words stored with an input word, first driving means for modifying the binary "ones" of said stored words and second driving means for modifying the binary "zeroes" of said stored words the improvement comprising:

a plurality of magnetic cores, each having two states of magnetic remanence and drivable therebetween, each core being coupled to another of said stored words;

a plurality of bistable sensing means each coupled to one of said stored words for being driven from a first stable state to a second stable state thereof by a signal from said word as a function of the comparison between said word and said input word in accordance with a predetermined comparison criterion;

first drive means for driving said plurality of magnetic cores to a first clear state of magnetic remanence;

means for coupling each of said bistable sensing means to another of said magnetic cores;

means for driving the magnetic cores coupled to said sensing means driven to said second stable state thereof by said signal, to a second set state of magnetic remanence;

means for coupling said first driving means to said magnetic cores for driving the rest of said magnetic cores to said second set state of magnetic remanence to modify the "ones" stored in the words coupled thereto;

means for driving the magnetic cores coupled to said sensing means driven to their second stable states by said signal to said first clear state of magnetic remanence; and means for coupling said second driving means to said magnetic cores for driving the rest of said magnetic cores to said clear state of magnetic remanence to modify the "zeroes" stored in the words coupled thereto.

7. In combination with an associative memory system wherein is included means for storing a plurality of multibit words, an input word and means for simultaneously comparing said input word with each of said stored words in accordance with a predetermined criterion and for providing a mismatch signal from each stored word which does not compare with said input word a circuit comprising:

a plurality of magnetic cores each coupled to another of said stored words, each having two states of magnetic remanence and drivable therebetween;

a plurality of sensing means each being drivable between first and second stable states thereof;

means for coupling said sensing means to said plurality of stored words to drive the sensing means coupled to words which do not match said input word to their clear means for driving the magnetic cores to a first state of magnetic remanence;

switching means for coupling said plurality of magnetic cores to said plurality sensing means for driving the magnetic cores coupled to sensing means in said second stable state to a second state of magnetic remanence;

means for driving the cores coupled to sensing means in said first stable state to said second state of magnetic remanence;

control means for activating said clear means to drive said plurality of said magnetic cores to said first state of magnetic remanence and for driving the sensing means coupled to matched stored words to their second stable states, said control means further controlling said switching means for driving the magnetic cores coupled to sensing means in their second stable state to their second state of magnetic remanence; and means for driving the cores coupled to sensing means which are in their second stable state to their first state of magnetic remanence.

8. In combination with an associative memory system wherein is included means for storing a plurality of multibit words, an input word and means for simultaneously comparing said input word with each of said stored words in accordance with a predetermined criterion and for providing a mismatch signal from each stored word which does not compare with said input word a circuit comprising:

a plurality of magnetic cores each coupled to another of said stored words, each having two states of magnetic remanence and drivable therebetween;

a plurality of sensing means each being drivable between first and second stable states;

means for coupling said sensing means to said plurality of stored words to drive the sensing means coupled to words which do not match said input word to their second stable state;

means for coupling said plurality of magnetic cores to said plurality of sensing means;

means for driving the magnetic cores coupled to sensing means in said second stable state which are coupled to words which do not match said input word to a first state of magnetic remanence and for maintaining the rest of the cores in a second state of magnetic remanence;

means for switching said rest of the cores to said first state of magnetic remanence to induce a first set of signals in the words coupled thereto;

means for driving the magnetic cores coupled to said sensing means in said second stable state to said second state of magnetic remanence; and means for switching the magnetic cores coupled to sensing means in said first stable state to said second state of magnetic remanence to induce a second set of signals in the words coupled thereto.

References Cited

UNITED STATES PATENTS

| | | | |
|---|---|---|---|
| 2,922,145 | 1/1960 | Bobeck | 340—174 |
| 3,075,183 | 1/1963 | Warman et al. | 340—174 |
| 3,089,035 | 5/1963 | Strohmeier et al. | 307—88 |
| 3,222,645 | 12/1965 | Davis | 340—174 |

BERNARD KONICK, *Primary Examiner.*

BARRY L. HALEY, *Assistant Examiner.*

U.S. Cl. X.R.

340—146.2, 174